United States Patent [19]

Nagano, Masashi

[11] Patent Number: 5,213,005
[45] Date of Patent: May 25, 1993

[54] SPEED CONTROL DEVICE FOR BICYCLE DERAILLEUR

[75] Inventor: Nagano, Masashi, Izumi, Japan
[73] Assignee: Shimano, Inc., Osaka, Japan
[21] Appl. No.: 891,911
[22] Filed: Jun. 1, 1992

Related U.S. Application Data

[63] Continuation of Ser. No. 548,583, Jul. 5, 1990, abandoned.

[30] Foreign Application Priority Data

Jul. 6, 1989 [JP] Japan ................................. 1-175329

[51] Int. Cl.⁵ .......................... F16C 1/10; G05G 11/00
[52] U.S. Cl. ....................................... 74/502.2; 74/142;
74/475; 74/489; 74/473 R
[58] Field of Search ...................... 74/502.2, 142, 475,
74/489, 473 R

[56] References Cited

U.S. PATENT DOCUMENTS

| | | | |
|---|---|---|---|
| 3,941,008 | 3/1976 | Cambria | 74/473 R |
| 3,972,247 | 8/1976 | Armstrong | 74/489 |
| 4,194,408 | 3/1980 | Hedrich | 74/502.2 |
| 4,232,504 | 11/1980 | Yamasaki | 74/489 X |
| 4,267,744 | 5/1981 | Yamasaki | 74/475 |
| 4,658,667 | 4/1987 | Schuller | 74/475 |
| 4,667,459 | 5/1987 | Scanland et al. | 74/475 X |
| 4,699,018 | 10/1987 | Tagawa | 74/502.2 |
| 4,731,046 | 3/1988 | Juy | 74/502.2 |
| 4,864,885 | 9/1989 | Nagano | 74/475 X |
| 4,876,913 | 10/1989 | Romano | 74/475 X |

FOREIGN PATENT DOCUMENTS

| | | | |
|---|---|---|---|
| 371429 | 6/1990 | European Pat. Off. | 74/502.2 |
| 3727505 | 8/1987 | Fed. Rep. of Germany | 74/502.2 |
| 2012893 | 5/1978 | United Kingdom | 74/502.2 |

*Primary Examiner*—Vinh T. Luong
*Attorney, Agent, or Firm*—Dickstein, Shapiro & Morin

[57] ABSTRACT

A control device for a bicycle derailleur that includes a fixing member, control structure for effecting a change speed, a reciprocating member reciprocatably supported by the fixing member and operatively connected to the derailleur to be movable between a forward direction for shifting a chain from a smaller sprocket to a larger sprocket and in a backward direction for shifting the chain from the larger sprocket to the smaller sprocket, the reciprocating member being urged in the backward direction, and a retaining mechanism acting as a one-way mechanism for permitting the reciprocating member to move in the forward direction and preventing the same from moving in the backward direction thereby to position and maintain the reciprocating member. The retaining mechanism can retain the reciprocating member in one set position or an intermediate position displaced from the set position for each of a plurality of speeds in the forward direction, and can release the positional maintenance of the reciprocating member thereby to selectively maintain the reciprocating member in a set position displaced from the maintaining position, or in a further set position more displaced in the backward direction.

12 Claims, 8 Drawing Sheets

Fig. 14

SPEED CONTROL DEVICE FOR BICYCLE DERAILLEUR

This application is a continuation of application Ser. No. 07/548,583 filed Jul. 05, 1990, now abandoned.

BACKGROUND OF INVENTION

1. Field of the Invention

The present invention relates to a control device for a bicycle derailleur comprising a fixing member, control means for effecting a change speed, a reciprocating member reciprocatively supported by the fixing member and operatively connected to the derailleur to be movable by operating the control means in forward direction for shifting a chain from a smaller sprocket to a larger sprocket and in a backward direction for shifting the chain from the larger sprocket to the smaller sprocket while being urged in the backward direction, and a retaining mechanism acting as a one-way mechanism for permitting the reciprocating member to move in the forward direction and preventing the same from moving in the backward direction thereby to position and maintain the reciprocating member.

2. Description of the Prior Art

One example of the known retaining mechanisms for derailleur control devices of this type is shown in GB 2,169,065 A disclosing the reciprocating member pivotally supported by the fixing member, recesses defined in a lower face of the reciprocating member for stepwise positionally maintaining the reciprocating member, and further recesses defined in an upper face of the reciprocating member for stepwise releasing the reciprocating member. A ratchet mechanism is structured to include a retaining pawl directing upwardly and defined in a button constantly urged upwardly for engaging the lower recesses, and a restraining pawl directing downwardly and defined in the button for engaging the upper recesses and effecting a stepwise release when pushing down the button. The reciprocating member is maintained in one set position for each of a plurality of speeds in the forward and backward directions by alternately engaging two pairs of pawls and recesses.

Figure 12A:
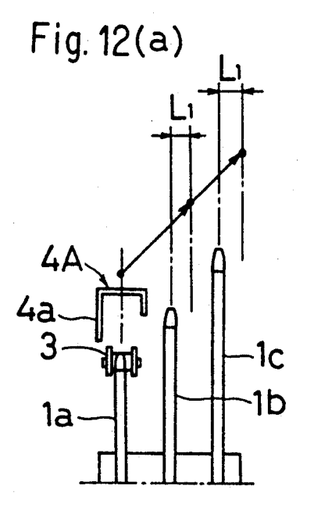
FIG. 12(a) illustrates a shifting condition of a chain.

When shifting the chain from the smaller sprocket to the larger sprocket, it is necessary to overshift a chain portion supported by the derailleur to the larger sprocket beyond a position corresponding to a sprocket to be engaged (FIG. 12(a)).

Figure 12B:
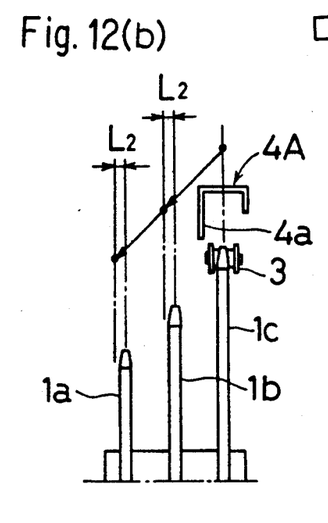
FIG. 12(b) illustrates another shifting condition of a chain.

When shifting the chain from the larger sprocket to the smaller sprocket, it is necessary to overshift the chain portion supported by the derailleur to the smaller sprocket beyond the position corresponding to the sprocket to be engaged (FIG. 12(b)).

It should be noted that the overshift amount is substantially constant when the chain is shifted from the larger sprocket to the smaller sprocket while the overshift amount varies when the chain is shifted from the smaller sprocket to the larger sprocket. This is because the tension of the chain is changed significantly when shifting from the smaller sprocket to the larger sprocket. The more increased the tension is, the more increased the overshift amount is.

However, according to the conventional structure, the reciprocating member is maintained in only one set position for each speed and not in an overshift position when the chain is shifted from the smaller sprocket to the larger sprocket, which does not allow a smooth change speed. In addition, when the reciprocating member is returned to the backward direction, the pawl is engaged with one of the recesses for the stepwise release thereby to prevent a plurality of speed changes and a quick speed change control.

SUMMARY OF THE INVENTION

An object of the present invention is to provide a control device for a bicycle derailleur which can realize an easy, quick and effective change speed by shifting a chain.

In order to achieve the above-noted object, a control device for a bicycle derailleur comprises a retaining mechanism for maintaining a reciprocating member in one set position or an intermediate position displaced from the set position for each of a plurality of speeds in a forward direction, while releasing the reciprocating member from the positional maintenance thereby to selectively maintain the reciprocating member in a set position displaced from the maintaining position, or a further set position more displaced in the backward position.

With such structure, when shifting the chain from the larger sprocket to the smaller sprocket, the overshift amount is constant as set forth above and the reciprocating member is maintained in one set position for each speed, and thus the reciprocating member is only required to be maintained in one set position for each of the plurality of speeds in the backward direction. When the chain is shifted from the smaller sprocket to the larger sprocket, the overshift amount varies with each speed position as noted above, and thus the reciprocating member is maintained in the appropriate intermediate position for each of the plurality of speeds in the forward direction to reliably shift the chain. It should be further noted that when the reciprocating member is moved in the backward direction, a quick and easy change speed is desirably and smoothly effected by a simple operation of just moving the reciprocating member to one set position determined as a suitable chain shift position for each speed condition. Furthermore, the retaining mechanism is selectively operable to maintain the reciprocating member in a set position displaced from the maintaining position, or a further set position displaced from the set position in the backward direction. This make it easy to shift the chain from the larger sprocket to the smaller sprocket.

In working the present invention, the retaining mechanism may be selectively operable to maintain the reciprocating member in any one of the set positions in response to an operational amount of the control means when moving the reciprocating member in the backward direction. According to such construction, since it is easy to adjust the operational amount of the control means, the change speed is effected more quickly with more comfortable feel by a fine adjustment of the control means.

The retaining mechanism may comprise a ratchet mechanism including a pawl and a plurality of teeth to be engaged with each other in which the teeth may have projections defined to become radially shorter at respective engaging positions with the pawl as the reciprocating member moves in the forward direction thereby to change a relative position between the pawl and the teeth in a radial direction by the control means. In this structure, the reciprocating member can be maintained in a position for each speed in the backward direction by controlling a retracting amount of the ratchet pawl utilizing the length variance of teeth projections. In other words, the reciprocating member can be maintained in one set position for each speed in the backward direction, utilizing the points defining various lengths of the projections of the ratchet teeth. This allows the change speed effected by moving the reciprocating member in the backward direction to be realized by a simple operation of changing the relative radial position between the pawl and the teeth.

Other objects and effects will be apparent from the following detailed description of preferred embodiments of the invention.

BRIEF DESCRIPTION OF THE DRAWINGS

The drawings illustrate a speed change control device for a bicycle embodying the present invention in which:

FIG. 1 is a sectional view of the control device taken along line A—A of FIG. 9, showing a speed change condition;

FIG. 2 is a sectional view of the control device taken along line A—A of FIG. 9, showing another speed change condition;

FIG. 3 is a sectional view of the control device taken along line A—A of FIG. 9, showing another speed change condition;

FIG. 4 is a sectional view of the control device taken along line A—A of FIG. 9, showing another speed change condition;

FIG. 5 is a sectional view of the control device taken along line A—A of FIG. 9, showing another speed change condition;

FIG. 6 is a sectional view of the control device taken along line A—A of FIG. 9, showing another speed change condition;

FIG. 13 shows a control device according to a second embodiment of the present invention; and FIG. 14 shows the control device according to the second embodiment of the present invention.

DESCRIPTION OF THE PREFERRED EMBODIMENTS

Embodiments according to the present invention will be described hereinafter, referring to the accompanying drawings.

Figure 11:
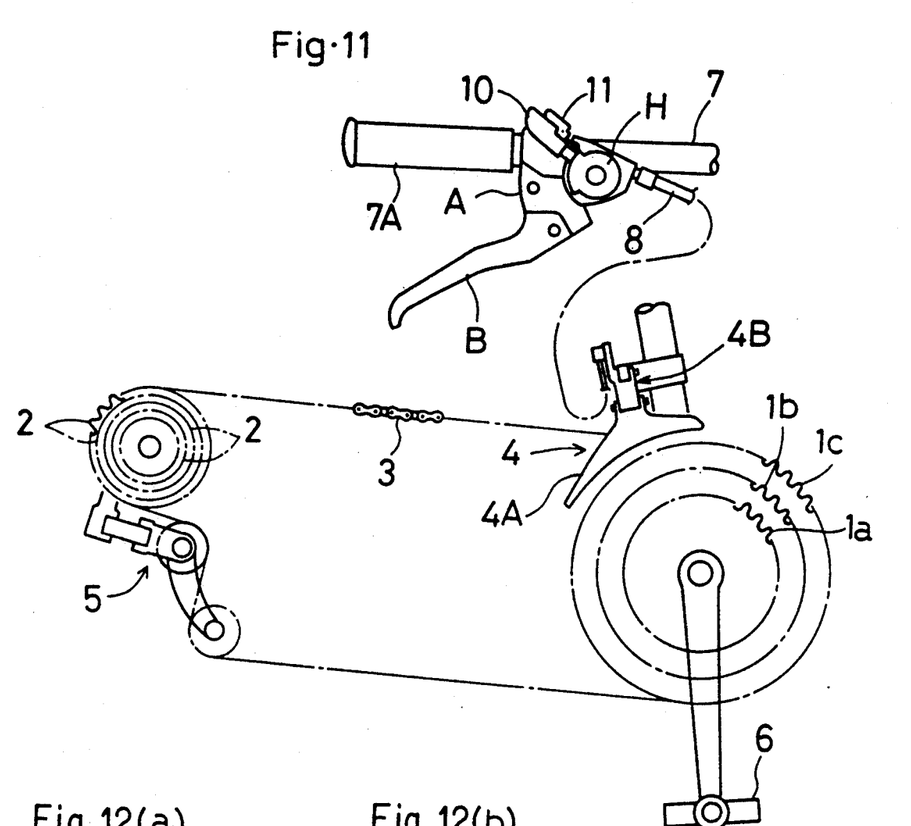
FIG. 11 is a schematic view of a speed change mechanism.

As shown in FIG. 11, a change speed device for a bicycle comprises three front sprockets 1a, 1b and 1c having different diameters to one another, a plurality of rear sprockets 2 having different diameters to each other, a chain 3 engaging and extending between the front sprockets 1a, 1b and 1c and the rear sprockets 2, a front derailleur 4, and a rear derailleur 5.

The front sprockets 1a, 1b and 1c are rotated by a pedal 6, and the rear sprockets 2 are rotated with a rear wheel in unison.

Referring to FIGS. 12(a) and 12(b), the front derailleur 4 mainly includes a chain control portion 4A and a link mechanism 4B supporting the chain control portion 4A to be movable in a juxtaposing direction of the sprockets. A spring which is not illustrated is incorporated into the link mechanism 4B. The spring urges the chain control portion 4A toward the small sprocket 1a.

A control device for the front derailleur 4 is attached to a handle 7, which will be described in detail below.

As shown in FIGS. 1 to 9, the control device comprises a rotatable member 9 as a reciprocating member operatively connected to the front derailleur 4 through a release wire 8, a retaining mechanism H for positioning and maintaining the rotatable member 9 in a forward direction F for shifting the chain 3 from the smaller sprocket to the larger sprocket and in a backward direction R of the rotatable member 9 for shifting the chain 3 from the larger sprocket to the smaller sprocket, respectively, a forward movement control lever 10 for the rotatable member 9, and a backward movement control lever 11 for the rotatable member 9.

Figure 8:
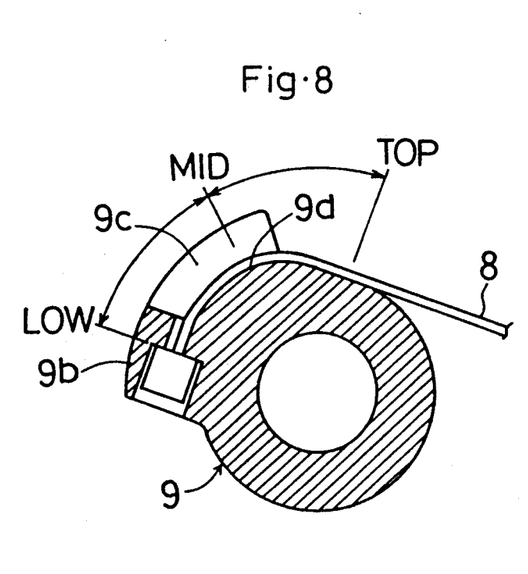
FIG. 8 is a sectional view taken along line B—B of FIG. 9.

As shown in FIGS. 8 and 11, the control device is assembled to a support frame A of a brake control lever B fixed to the handle 7 in which the forward movement control lever 10 and the backward movement control lever 11 are positioned to be easily pushed in the forward direction F by the thumb of the cyclist holding a handle grip 7A.

The retaining mechanism H can maintain the rotatable member 9 in one set position for each of a plurality of speeds in the backward direction R, and in an intermediate position displaced from the set position for each of the plurality of speeds in the forward direction F. More particularly, the retaining mechanism H utilizes a ratchet mechanism permitting the rotatable member 9 to move in the forward direction F while preventing the rotatable member 9 from moving in the backward direction R. The ratchet mechanism includes engaged members such as ratchet teeth 12 moving with the rotatable member 9 and arranged with teeth projections being defined to become radially longer stepwise in the forward direction F, and an engaging member such as a ratchet pawl 13 operable for varying a retracting amount thereof, thereby to maintain the rotatable member in the positions corresponding to the plurality of speeds in the backward direction R. The ratchet teeth 12 and the pawl 13 form parts of a positioning mechanism.

The rotatable member 9 is urged to return by a torsion coil spring 14 acting upon an urging force of the front derailleur 4 toward the smaller sprocket and upon the rotatable member 9.

Next, the retaining mechanism H and the control mechanism of the forward movement control lever 10 and the backward movement control lever 11 will be described. The reference symbols F and R will be omitted hereinafter.

Figure 7:
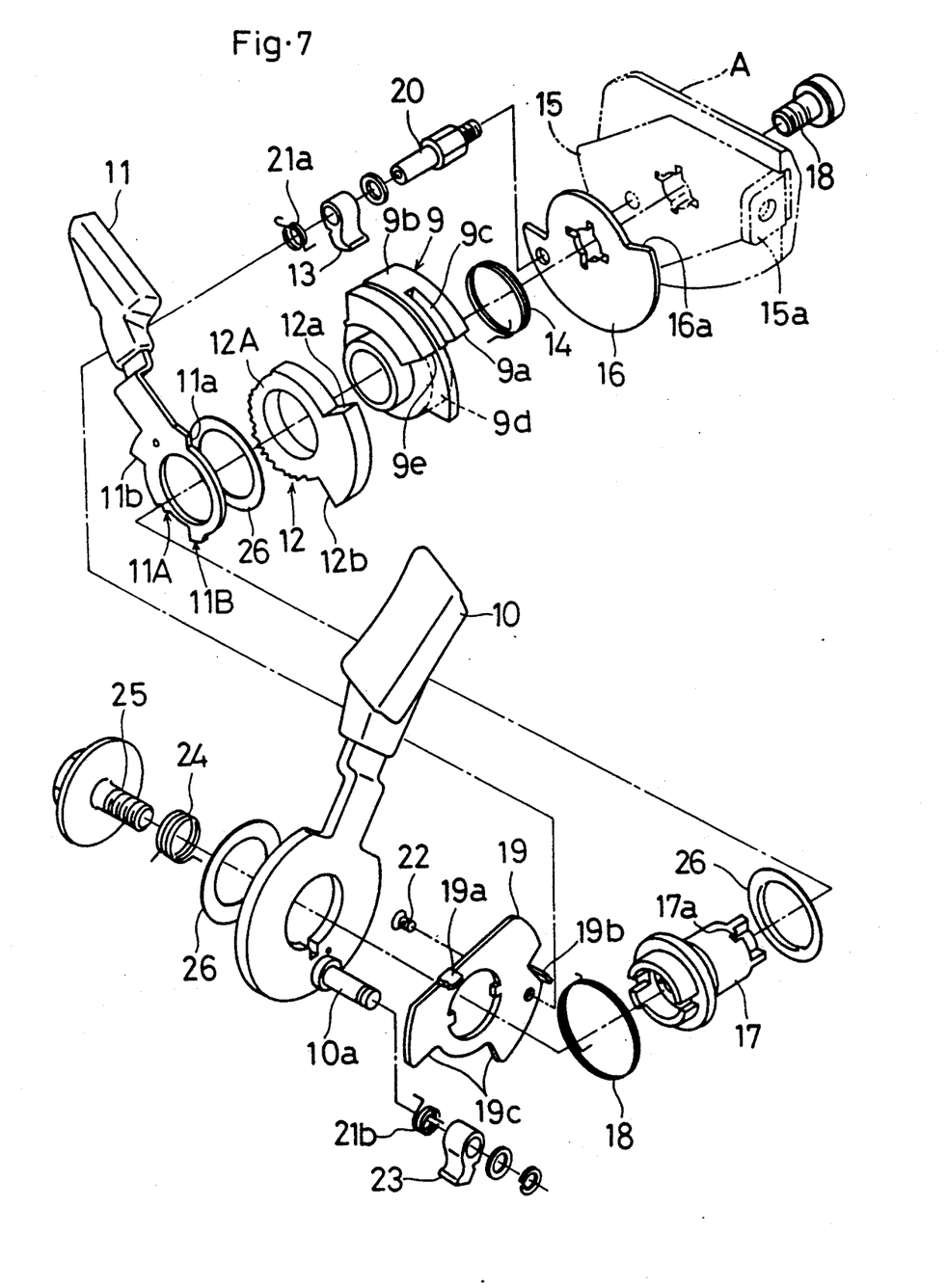
FIG. 7 is an exploded perspective view of the control device.
Figure 9:
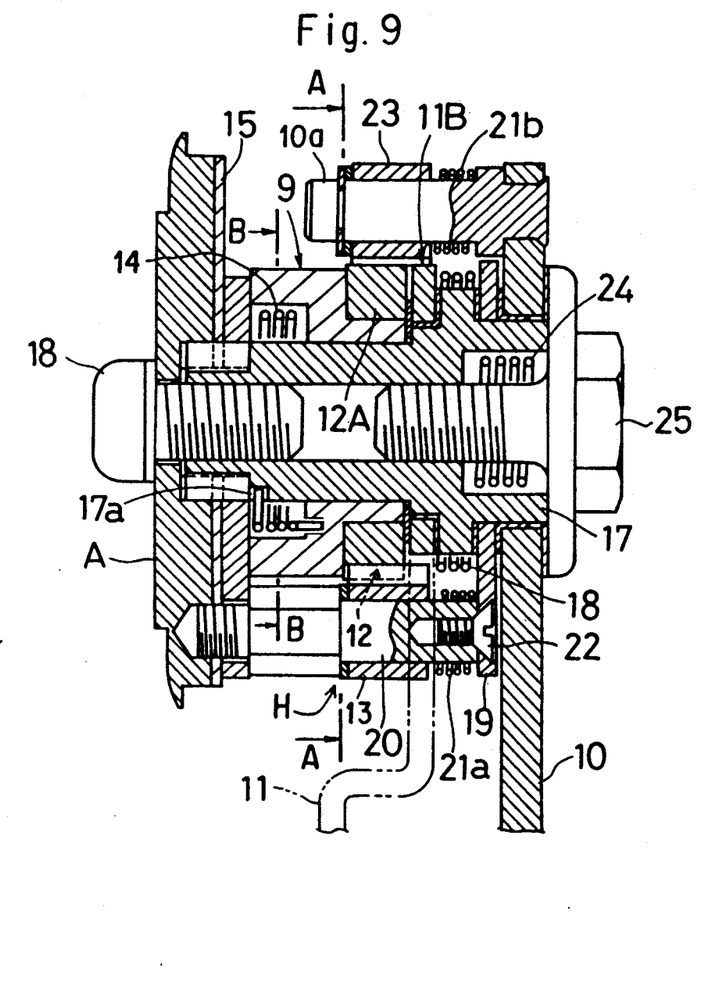
FIG. 9 is a sectional view taken along a support shaft of the control device, showing a mounting structure between a cable and a rotatable element.

As shown in FIGS. 7 to 9, a wire support 15 with an outer wire end supporting portion 15a for the release wire 8 is attached to the brake control lever support frame A. The wire support 15 carries a restraining member 16 placed thereon for restraining the return limit of the rotatable member 9. The restraining member 16 has a receiving portion 16a for engaging a received portion 9a defined in the rotatable member 9.

A support shaft 17 extends through the brake control lever support frame A, the wire support 15 and the return limit restraining member 16 to be relatively unrotatable. The support shaft 17 is fixed to the brake control lever support frame A through a bolt 18.

The rotatable member 9 is rotatably fitted on the support shaft 17 to be placed on the return limit restraining member 16. The rotatable member 9 has an inner wire end supporting portion 9b for the release wire 8, an inner wire end guide groove 9c and an inner wire take-up sleeve 9d. The rotatable member 9 accommodates the torsion coil spring 14. One end of the spring 14 engages a recess 17a of the support shaft 17, and the other end of the spring 14 is inserted into the rotatable member 9.

A ratchet teeth defining member 12A is fitted on the rotatable member 9. The ratchet teeth defining member 12A includes a received portion 12a contacting a receiving portion 9e of the rotatable member 9 to be rotatable in unison.

The backward movement control lever 11 is rotatably fitted on the support shaft 17 to be placed on the ratchet teeth defining member 12A. The backward movement control lever 11 includes a boss portion defining a cam portion 11A for retracting the ratchet pawl 13. The backward movement control lever 11 is urged to the backward direction through a torsion coil spring 18. The return limit of the lever 11 is restrained by an oscillating limit restraining member 19, and the pushing limit of the lever 11 toward the forward direction is restrained by contact between the lever and the ratchet pawl 13.

The restraining member 19 is unrotatably fitted on the support shaft 17 and defines in its outer periphery a receiving portion 19a corresponding to a received portion 11a of the backward movement control lever 11 for restraining the return limit of the lever. The backward movement control lever 11 further defines a received portion 11b contacting a boss portion of the ratchet pawl 13.

The ratchet pawl 13 is rotatably fitted on a pivot shaft 20 screwed at one end to the brake control lever frame A, and is urged toward an engaging direction through a torsion coil spring 21a supported in turn at one end by a supporting portion 19b defined in the restraining member 19. The pivot shaft 20 is fixed at the other end to the restraining member 19 by a screw 22 thereby to constitute the retaining mechanism H.

The forward movement control lever 10 is relatively rotatably fitted on the support shaft 17 to be placed on the restraining member 19. The forward movement control lever 10 includes a support pin 10a fitting to a ratchet pawl 23 for controlling the forward movement of the rotatable member. The ratchet pawl 23 is urged toward an engaging direction through a torsion coil spring 21b, and contacts a contact portion 12b of the ratchet teeth defining member 12A or engages one of the ratchet teeth 12 thereby to rotate the rotatable member 9 in accordance with an oscillation of the forward movement control lever 10.

The forward movement control lever 10 is oscillatable within a predetermined range restricted by contact between a pair of receiving portions 19c of the restraining member 19 and the ratchet pawl 23, and is urged to return toward the backward direction by a torsion coil spring 24, thereby to constitute the oneway mechanism for moving the rotatable member 9 in the forward direction whenever the forward movement control lever 10 is oscillated in the forward direction.

When moving the rotatable member 9 in the backward direction, it is required to disengage the ratchet pawl 23 of the forward movement control lever 10 from one of the ratchet teeth 12 as well as to disengage the ratchet pawl 13 from one of the ratchet teeth 12 by retracting the ratchet pawl 13 by using the cam portion 11A. Thus, the backward movement control lever 11 similarly defines a cam portion 11B in order to retract the ratchet pawl 23 for the forward movement control.

Numeral 25 denotes a flange bolt screwed to the support shaft 17 for supporting the forward movement control lever 10. Numeral 26 indicates ring spacers According to the present invention, three different speeds can be obtained by shifting the chain 3 between the three front sprockets 1a, 1b and 1c, in which a condition with the chain 3 engaging the small sprocket 1a will be referred to as a low speed condition, a condition with the chain 3 engaging the intermediate sprocket 1b as a middle speed condition, and a condition with the chain 3 engaging the large sprocket 1c as a top speed condition.

Referring now to FIG. 12(a), when moving the rotatable member 9 in the forward direction to effect the change speed in the order of the low, the middle and the top speed conditions by shifting the chain from the smaller sprocket to the larger sprocket, it is required to overshift a chain portion supported by the chain control portion 4A of the front derailleur 4 to the larger sprocket beyond a position corresponding to the sprocket to be engaged. The over shift amount L1 is directly proportional to the tension of the chain 3. In contrast, as shown in FIG. 12(b), when moving the rotatable member 9 in the backward direction to effect the change speed in the order of the top, the middle and the low speed conditions by shifting the chain from the larger sprocket to the smaller sprocket, it is required to overshift the chain portion supported by the chain control portion 4A of the front derailleur to the smaller sprocket beyond a position corresponding to the sprocket to be engaged. In this case, an overshift amount L2 is constant.

This allows, when moved in the forward direction to effect the change speed, the rotatable member 9 to be maintained in a plurality of stepwise positions in the middle and the top speeds, respectively, by varying an engaging position of the ratchet pawl 13 with the ratchet teeth 12.

On the contrary, when moved in the backward direction to change the top speed to the middle speed, the rotatable member 9 is maintained in one single set position corresponding to the mid speed by defining the ratchet teeth projections to become radially longer stepwise in the forward direction, and by varying the retracting amount of the ratchet pawl 13 with the pushing amount by the backward movement control lever 11 in the forward direction, as set forth above. Further, when moved in the backward direction to change the middle speed to the low speed, the rotatable member 9 is maintained in one set position corresponding to the low speed by engaging the received portion 9a of the rotatable member 9 with the receiving portion 16a of the return limit restraining member 16, and by varying the retracting amount of the ratchet pawl 13 with the pushing amount by the backward movement control lever 11 in the forward direction.

Figure 10:
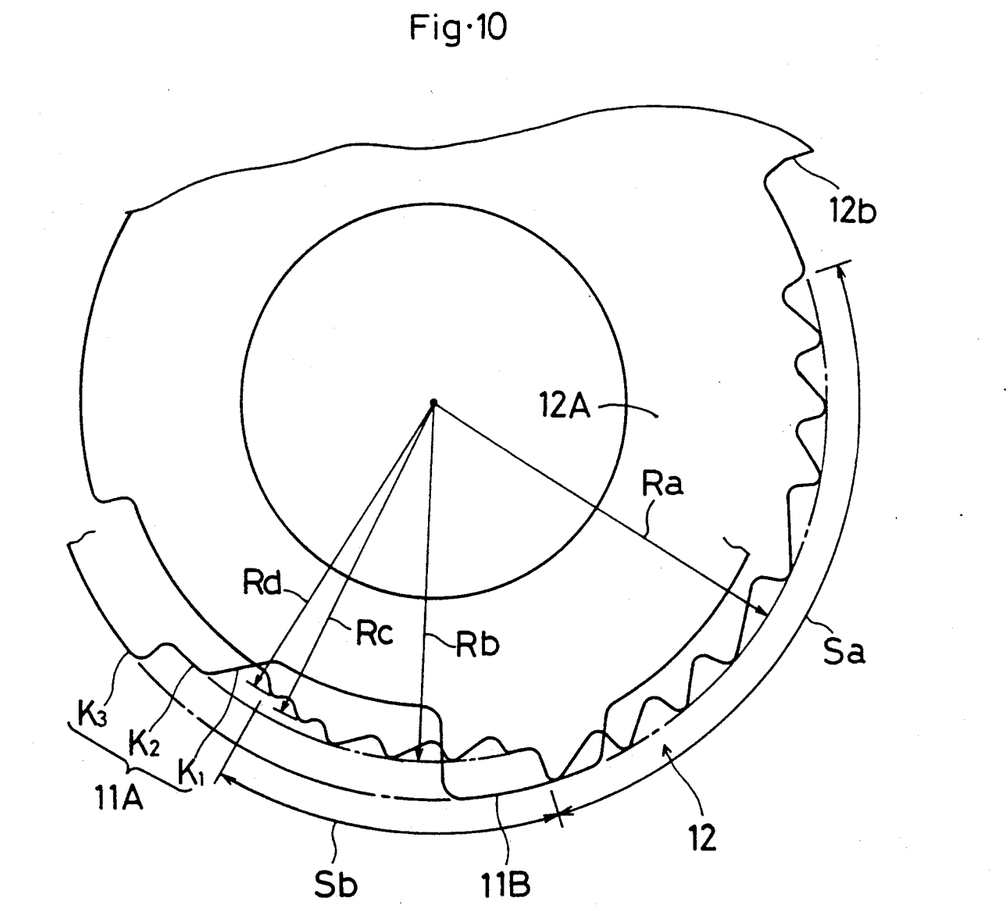
FIG. 10 is a plan view showing cam shapes.

The shapes of the ratchet teeth 12 and the cam portion 11A of the backward movement control lever 11 will be described in more detail referring to FIG. 10. The ratchet teeth 12 comprise a section Sa having the longer teeth projections with an increased diameter Ra, and a section Sb having the shorter teeth projections with a reduced diameter Rb.

Two of the teeth in the section Sb positioned at an end portion in the backward direction have further shorter projections with further reduced diameters Rc and Rd, respectively. With this structure, when rotated in the forward direction to shift to the top speed, the rotatable member 9 can be slightly returned in the backward direction if the chain 3 contacts the chain control portion 4A of the front derailleur 4 to produce a noise. This returning operation is effected by pressing the rotatable member so as to retract the ratchet pawl 13 at the cam portion 11A by a small amount. A contacting noise may also be produced between the chain 3 and the chain control portion 4A of the front derailleur 4 when rotating the rotatable member 9 in the forward direction to shift to the middle speed. In this case also, the rotatable member can be pressed so as to retract the ratchet pawl 13 at the cam portion 11A by a small amount thereby to return backward slightly.

The cam portion 11A essentially includes an inclined cam face K1 for retracting the ratchet pawl 13 by a small amount when shifted to the top speed condition, a cam face K2 for retracting the ratchet pawl 13 by a predetermined amount when shifted from the top speed condition to the middle speed condition, and a cam face K3 for retracting the ratchet pawl 13 by a predetermined amount when shifted from the middle speed condition to the low speed condition.

A series of operations of the front derailleur 4 will be described below.

FIGS. 1 to 4 illustrate an operation for shifting from the low speed condition to the top speed condition. When shifting from the low speed condition to the middle speed condition, the forward movement control lever 10 is operated in the forward direction where the ratchet pawl 23 for the forward movement presses the contact portion 12b of the ratchet teeth defining member 12A thereby to move the rotatable member 9 in the forward direction. When shifting from the middle speed condition to the top speed condition, the forward movement control lever 10 is operated in the forward direction thereby to move the rotatable member 9 in the forward direction through the ratchet pawl 23 for the forward movement engaging the ratchet teeth 12.

FIGS. 5 and 6 illustrate an operation for shifting from the top speed condition to the low speed condition. The middle speed is obtained by operating the backward movement control lever 11 by one step in the forward direction, and the low speed is obtained by operating the backward movement control lever 11 by two steps in the forward direction. That is, it is possible to shift from the top speed condition to the low speed condition in a single operation by operating the backward movement control lever 11 by a great amount.

As seen from FIG. 8, the take-up sleeve 9d of the rotatable member 9 has a larger diameter at a portion between positions corresponding to the low speed condition and the middle speed condition, and a smaller diameter at a portion between positions corresponding to the middle speed condition and the top speed condition thereby to allow a great force to be produced by a less operational force when shifting from the middle speed condition to the top speed condition. This contributes to a light operation even if a change speed resistance is intense when shifting from the middle speed condition to the top speed condition. One of the causes of a great change speed resistance produced when shifting from the middle speed condition to the top speed condition is that the chain 3 is pressed against one of lateral sides of the large sprocket 1c corresponding to the top speed condition by one of a pair of chain pressing pieces 4a of the chain control portion 4A for shifting the chain 3 to the larger sprocket.

In summary, the above-described speed change control device is formed of a fixing member 17, a take-up element 9, a take-up control lever 10, and a first one-way mechanism formed of a first pawl 13 and a plurality of teeth 12. The teeth 12 include at least a first tooth Sb and a second tooth Sa, with the second tooth Sa having a greater height than the first tooth Sb. The speed change control device also has a release control means 11 for disengaging the pawl 13 from the teeth 12 and for thereby allowing the take-up element 9 to move in a rewinding direction. The speed change control device also has a second one-way mechanism 23 mounted between the take-up control lever 10 and the take-up element 9.

Other embodiments according to the present invention will be described hereinafter.

The derailleur control device according to the present invention will perform a remarkable effect when applied to an operation of the front derailleur in which the maintaining position of the reciprocating member 9 tends to be vary for the same speed conditions in the forward direction and the backward direction, but may be applied to an operation of the rear derailleur 5. Of course, it may be used in various types of derailleurs.

In the foregoing embodiment, the reciprocating member 9 can be maintained in a plurality of stepwise positions in the forward direction by utilizing the ratchet mechanism, but can be maintained in stepless positions in the forward direction by utilizing a friction mechanism for providing a resistance when the reciprocating member 9 moves. In order to maintain the reciprocating member 9 in one set position for each speed in this case, an element moving with the reciprocating member 9 may be provided with received portions having projections varying stepwise along the forward direction in which a retracting amount of an element contactable with the received portions can be controlled by the backward movement control lever 11, in the same manner as in the ratchet pawl 13 noted above. In this embodiment, a friction effect caused by the friction mechanism can be released by the backward movement control lever 11.

With respect to the reciprocating member 9 maintained in the plurality of stepwise positions in the forward direction by using the ratchet mechanism, the following modification is possible: The ratchet pawl 13 may be supported by the reciprocating member 9 to be moved in unison while the ratchet teeth 12 can be supported by a fixed member, or the backward movement limit of the reciprocating member 9 can be also restricted by the heights of the teeth projections.

Two levers, i.e. the forward movement control lever 10 and the backward movement control lever 11, can be replaced by a single lever. More particularly, the forward movement control lever 10 in the first embodiment may be structured to include a distal end bendable with respect to a proximal end thereof in another direction to the operating direction of the reciprocating member 9 thereby to move the cam portions 11A and 11B, or may be structured as shown in FIGS. 13 and 14. In those figures, a stopper 27 for restraining the return limit of the forward movement control lever 10 is resiliently supported by a compression coil spring 28 to allow the forward movement control lever 10 to be operated against a resilient force of the coil spring 28 beyond the operational rotation limit of the reciprocating member 9. A rotatable element 29 may be provided defining a cam portion 29A for retracting the ratchet pawl 13, and an arcuate slot 30 for receiving an engaging pin 31 attached to the forward movement control lever 10 to be rotated in unison. A further cam portion 32 may be fixedly provided for disengaging the ratchet pawl 23 for the forward movement of the reciprocating member 9 from the ratchet teeth 12 when operating the forward movement control lever 10 against the resilient force of the coil spring 28 beyond the rotation limit of the reciprocating member 9. With this construction, when operating the forward movement control lever 10 within the operational rotation limit of the reciprocating member 9, the forward movement control lever 10 can be operated against the resilient force of the coil spring 28 beyond the rotation limit of the reciprocating member 9 thereby to vary the retracting amount of the ratchet pawl 13 to operate the reciprocating member 9 in the backward direction as well as in the forward direction as set forth in the first embodiment.

The reciprocating member 9 may be slidable instead of rotatable. Further, the linkage between the reciprocating member 9 and the derailleur can be changed.

Whether the reciprocating member 9 is moved from the top speed corresponding position to the low speed corresponding position by a single operation may be selected not only by the backward movement control lever 11, but also by the respective cam faces of the cam portion 11A to be switchable and displaced along a rotational axis thereof.

What is claimed is:

1. A speed change control device for selectively positioning a bicycle derailleur (4) at a plurality of speed positions by controlling a cable (8) which is constantly urged in a rewinding direction (R) by the derailleur (4), said speed change control device comprising:

a fixing member (17);

a take-up element (9) for taking up the cable (8), said take-up element being urged in said rewinding direction, said take-up element being pivotably supported to said fixing member (17), said take-up element having a central axis;

a speed change control member (10, 23) for rotating said take-up element (9) in a winding direction (F) and for thereby taking up the cable (8) in said winding direction, said winding direction being opposite to said rewinding direction (R);

a positioning mechanism (13, 12) having a first engaging member (13) and a plurality of engaged members (12), said engaged members being provided on said take-up element, wherein said first engaging member (13) moves in an engaging direction to be engaged with said engaged members (12), and wherein said first engaging member moves in a disengaging direction to be disengaged from said engaged members, said engaging direction being radially toward said central axis of said take-up element (9), said disengaging direction being radially away from said central axis of said take-up element, and wherein said engaged members (12) form a plurality of groups (Sa, Sb) with each one of said groups corresponding to one of said speed positions, each of said groups having at least two of said engaged members having the same radial height relative to said central axis, with the engaged members of different groups having different heights, and with the heights increasing stepwise in the winding direction (F), and wherein said speed change control member (10, 23) cooperates with said first engaging member (13) to selectively rotate said take-up element (9) whereby, with one stroke of said speed change control member, said first engaging member is disengaged from an engaged member in a group corresponding to one of said speed positions and is engaged with an engaged member in a group corresponding to a next one of said speed positions, with said take-up element then being maintained in position by said positioning mechanism (13, 12); and release control means (11) for selectively lifting said first engaging member (13) in said disengaging direction, and for thereby disengaging said first engaging member (13) from an engaged member and for thereby allowing said take-up element to move in said rewinding direction (R) until said first engaging member (13) contacts an engaged member whose height is greater than the extent to which said first engaging member (13) is lifted by said release control means (11).

2. A speed change control device as claimed in claim 1, wherein said speed change control member includes a second engaging member for contacting said take-up element and for rotating said take-up element in said winding direction.

3. A speed change control device as defined in claim 2, wherein said plurality of speed positions include at least first, second and third speed positions, said take-up element having a contact surface for rotating said take-up element from said first speed position to said second speed position in said winding direction, and wherein said second engaging member engages one of said engaged members provided on said take-up element to rotate said take-up element from said second speed position to said third speed position in said winding direction.

4. A speed change control device as claimed in claim 2, wherein said second engaging member is a one-way mechanism including a pawl, and wherein said speed change control member includes a speed control lever having a home position, and means for returning said speed control lever to said home position after each speed change operation.

5. A speed change control device as claimed in claim 1, wherein said first engaging member is pivotably supported on said fixing member.

6. A speed change control device as claimed in claim 1, wherein said first engaging member and said engaged members are arranged to function as a one-way mechanism, said first engaging member including an engaging pawl, said engaged members including engaging teeth.

7. A speed change control device as claimed in claim 1, wherein said release control means includes a cam face for lifting said first engaging member in said disengaging direction, said cam face being separate from said engaged members.

8. A speed change control device as claimed in claim 1, wherein said speed change control member includes a speed control lever, said release control means including a release control lever, said release control lever being separate from said speed control lever, said release control lever being rotatable in said winding direction to release said first engaging member from engagement with one of said engaged members.

9. A speed change control device for selectively positioning a bicycle derailleur at at least first and second speed positions by controlling a cable which is constantly urged in a rewinding direction by the derailleur, said speed change control device comprising:

a fixing member;

a take-up element for taking up the cable, said take-up element being pivotably supported to said fixing member;

a take-up control lever for rotating said take-up element in a winding direction and for thereby taking up the cable in said winding direction, said winding direction being opposite to said rewinding direction;

a first one-way mechanism comprising a first pawl and a plurality of teeth, said pawl being selectively engageable with said teeth so as to selectively maintain said take-up element at: (1) first and second fixed positions corresponding to the first and second speed positions; and (2) first and second intermediate positions which correspond to but which are different than said first and second fixed positions; and wherein said plurality of teeth comprise at least a first tooth and a second tooth, said second tooth having a greater height than said first tooth, and wherein the direction from said first tooth to said second tooth is said winding direction; and release control means for disengaging said pawl from said plurality of teeth and for thereby allowing said take-up element to move in said rewinding direction; and wherein said release control means includes a plurality of first cams (11A) with different heights for moving said pawl (13) by different amounts; and wherein said take-up control lever (10) is urged in said rewinding direction, and wherein said speed change control device further comprises a second one-way mechanism mounted between said take-up control lever and said take-up element (9), said second one-way mechanism comprising a second pawl (23) for engaging said plurality of teeth (Sa), and wherein said speed change control device further comprises a second cam (11B) for disengaging said second pawl (23) from said plurality of teeth.

10. A speed change control device as claimed in claim 9, wherein said take-up element (10) is pivotably supported on an axis, and wherein said first and second teeth (Sb, Sa) project generally radially away from said axis.

11. A speed change control device as claimed in claim 10, wherein said first pawl (13) has an extreme end, and wherein said first cams (11A) are arranged to contact said extreme end of said first pawl.

12. A speed change control device as claimed in claim 9, wherein said release control means includes a release control lever (11) pivotably supported to said fixing member (A), and wherein said first cams and said second cam (11A, 11B) are rotated by said release control lever.

* * * * *